F. MAC VICAR.
AXLE MOUNT.
APPLICATION FILED DEC. 20, 1913.

1,154,143.

Patented Sept. 21, 1915.

Inventor
Frank Mac Vicar

Witnesses
F. R. Moran.
V. B. Hillyard.

By Victor J. Evans
Attorney

UNITED STATES PATENT OFFICE.

FRANK MacVICAR, OF SYRACUSE, NEW YORK.

AXLE-MOUNT.

1,154,143.  Specification of Letters Patent.  Patented Sept. 21, 1915.

Application filed December 20, 1913. Serial No. 807,983.

*To all whom it may concern:*

Be it known that I, FRANK MACVICAR, a citizen of the United States, residing at Syracuse, in the county of Onondaga and State of New York, have invented new and useful Improvements in Axle-Mounts, of which the following is a specification.

The primary object of this invention is to relieve the steering knuckles, pivots, arms, track links and steering gear of motor vehicles from the effects of horizontal road shocks. These results are attained by mounting the stub axle in a unique manner so as to yield and thereby neutralize the shock which would otherwise be transmitted to the parts associated with the stub axles and steering mechanism and result in shortening their period of usefulness.

The present invention provides a frame which is pivotally connected with the yoke of the axle, a stub axle slidingly mounted in such frame and cushioning means between the frame and stub axle for sustaining the horizontal end thrust incident to the shock resulting from the wheel of a vehicle dropping in a rut or passing over an obstruction.

The invention consists of the novel features, details of construction and combination of parts, which hereinafter will be more particularly set forth, illustrated in the accompanying drawing, and pointed out in the appended claims.

Figure 1:
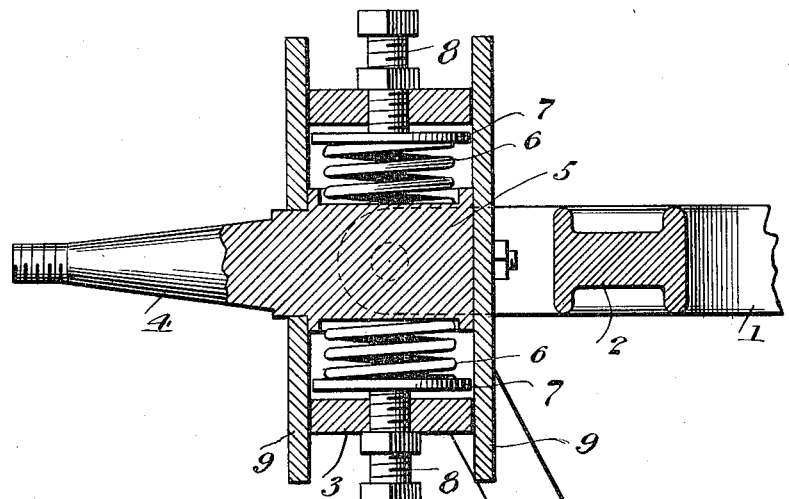
Figure 2:
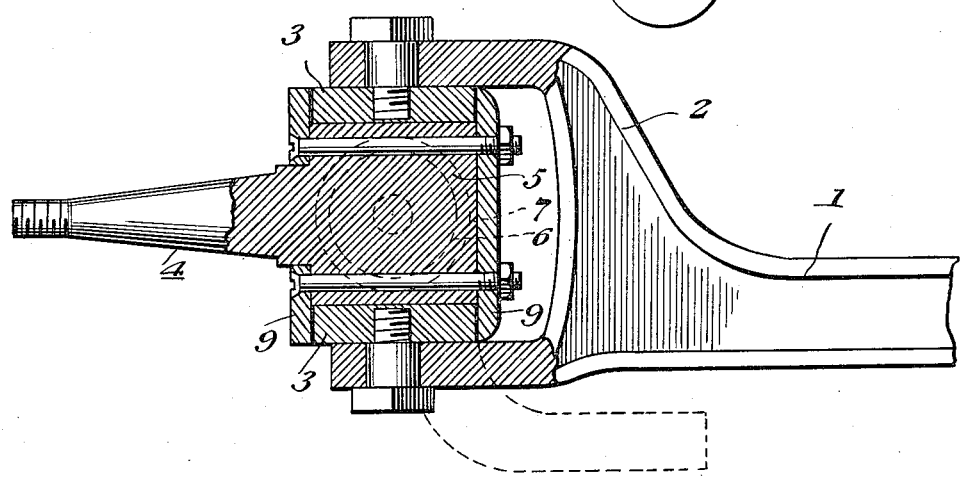

Referring to the drawing forming a part of the specification, Figure 1 is a horizontal section of a stub axle and mount, embodying the invention. Fig. 2 is a vertical transverse section.

The axle 1 is such as commonly provided for motor vehicles having the stub axles pivotally connected thereto by means of knuckle joints. A yoke 2 is provided at each end of the axle 1 and a frame 3 is pivotally connected to the arms of the yoke 2 so as to swing about a vertical axis. A stub axle 4 is slidingly mounted in the frame 3 and is retained in place therein in any manner. The stub axle 4 is formed with a head 5 which is slidingly mounted in the frame 3 and said stub axle may be of any usual form to receive a wheel, not shown, such as commonly provided for motor vehicles. Cushioning means are interposed between opposite sides of the head 5 and the ends of the frame 3. As shown the cushioning means consists of helical springs 6, the same being located in end portions of the frame 3 and confined between the head 5 and followers 7. Adjusting screws 8 are threaded into opposite ends of the frame 3 and have their inner ends engaging the follower 7. By advancing or retracting the adjusting screws 8 the effective tension of the cushioning springs 6 may be regulated. It is to be understood that the sides of the frame 3 may be closed in any manner as by means of cover plates 9, thereby preventing dust from entering the frame or lubricant escaping from such frame.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination, an axle, a frame pivotally connected to the axle to turn about a vertical axis, a stub axle mounted in such frame and adapted to have a horizontal movement and cushioning means between opposite sides of the stub axle and the ends of the frame.

2. In combination, an axle, a frame pivotally connected with the axle to turn about a vertical axis, a stub axle having a head which is mounted in the said frame to move horizontally, cushioning means between opposite sides of the stub axle head and the ends of the frame, and means detachably connected to the head of the stub axle for closing opposite sides of the frame.

3. In combination, an axle, a frame having pivotal connection with the axle to turn about a vertical axis, a stub axle mounted in the frame to move horizontally, cushioning devices at opposite sides of the stub axle, adjusting screws threaded into opposite ends of the frame and adapted to regulate the effective tension of the cushioning devices.

In testimony whereof I affix my signature in presence of two witnesses.

FRANK MacVICAR.

Witnesses:
CHARLES MacVICAR,
EDITH MacVICAR.